United States Patent
Reed et al.

(10) Patent No.: US 7,051,978 B2
(45) Date of Patent: May 30, 2006

(54) ADAPTABLE PAYLOAD PROCESSES

(75) Inventors: Raymond R. Reed, Sammamish, WA (US); Martin R. Grether, Bothell, WA (US); W. Forrest Frantz, North Bend, WA (US); Gina C. Pischke, Mill Creek, WA (US); Kelly L. Morgan, Renton, WA (US); Paul R. Fortado, Everett, WA (US); Todd Evan Jones, Lake Stevens, WA (US); Douglas W. Hackett, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/811,771

(22) Filed: Mar. 29, 2004

(65) Prior Publication Data

US 2005/0224650 A1  Oct. 13, 2005

(51) Int. Cl.
*B64C 1/20* (2006.01)

(52) U.S. Cl. .............................. 244/118.1; 244/137.1; 410/52

(58) Field of Classification Search ............ 244/118.1, 244/118.5, 118.6, 137.1, 137.2, 118.3; 410/1, 410/52
See application file for complete search history.

(56) References Cited

U.S. PATENT DOCUMENTS

| | | | |
|---|---|---|---|
| 2,422,693 A | 6/1947 | McArthur | |
| 2,579,003 A * | 12/1951 | Josephian | 280/2 |
| 2,876,969 A * | 3/1959 | Tydon et al. | 244/118.3 |
| 2,885,133 A | 5/1959 | Nelson | |
| 3,142,461 A * | 7/1964 | Naylor | 244/137.1 |
| 3,294,034 A * | 12/1966 | Bodenheimer et al. | 410/1 |
| 3,578,274 A * | 5/1971 | Ginn et al. | 244/118.6 |
| 3,904,064 A * | 9/1975 | Looker | 220/1.5 |
| 3,908,796 A | 9/1975 | Hurwitz | |
| 3,937,298 A | 2/1976 | Hurwitz | |
| 4,000,870 A * | 1/1977 | Davies | 410/92 |
| 4,479,621 A | 10/1984 | Bergholz | |
| 4,483,499 A * | 11/1984 | Fronk | 244/118.1 |
| 4,875,645 A * | 10/1989 | Courter | 244/137.1 |
| 4,929,133 A * | 5/1990 | Wiseman | 410/52 |
| 5,082,088 A | 1/1992 | Krause | |
| 5,090,639 A | 2/1992 | Miller | |
| 5,322,244 A * | 6/1994 | Dallmann et al. | 244/118.5 |
| 5,393,013 A | 2/1995 | Schneider | |
| 5,752,673 A * | 5/1998 | Schliwa et al. | 244/118.6 |
| 6,257,522 B1 | 7/2001 | Friend | |
| 6,260,813 B1 | 7/2001 | Whitcomb | |
| 6,302,358 B1 * | 10/2001 | Emsters et al. | 244/137.1 |
| 6,514,021 B1 | 2/2003 | Delay | |

(Continued)

*Primary Examiner*—Galen Barefoot
(74) *Attorney, Agent, or Firm*—Lee & Hayes, PLLC

(57) ABSTRACT

Processes for positioning, securing, and repositioning payload assemblies onto floor assemblies are disclosed. In one embodiment, a method includes forming a support structure having a plurality of elongated engagement members, each engagement member including an engagement surface adapted to support a load; forming an adaptable payload assembly that includes a payload member and at least one payload support coupled to the payload member, the payload support being adapted to transmit loads from the payload member to at least one engagement member, the payload support being moveable with the payload member relative to the support structure; and removeably coupling the payload support to at least one of the engagement surfaces of the engagement members. In an alternate embodiment, the engagement surfaces are at least one of approximately flush with and recessed below a lower surface of a panel supported by the support structure.

37 Claims, 7 Drawing Sheets

U.S. PATENT DOCUMENTS

| | | |
|---|---|---|
| 6,554,225 B1 | 4/2003 | Anast |
| 6,601,798 B1 | 8/2003 | Cawley |
| 6,619,588 B1 | 9/2003 | Lambiaso |
| 6,739,281 B1 * | 5/2004 | Grimes ........................ 114/364 |

* cited by examiner

ADAPTABLE PAYLOAD PROCESSES

CROSS REFERENCE TO RELATED APPLICATIONS

This patent application is related to the following co-pending, commonly-owned U.S. patent applications filed concurrently herewith on Mar. 29, 2004, which applications are hereby incorporated by reference: U.S. patent application Ser. No. 10/811,528 entitled "Non-Protruding Seat Track Apparatus and Methods" U.S. patent application Ser. No. 10/811,529 entitled "Adaptable Payload Apparatus and Methods;" U.S. patent application Ser. No. 10/811,522 entitled "Payload to Support Track Interface and Fitting Apparatus and Methods;" and U.S. patent application Ser. No. 10/811,787 entitled "Adaptable Payload Enabling Architecture".

FIELD OF THE INVENTION

This invention relates generally to processes for positioning, securing, and repositioning payload assemblies onto support structures, and more specifically, to positioning, securing, and repositioning payload assemblies onto floor assemblies.

BACKGROUND OF THE INVENTION

Many aspects of modern commercial aircraft are manufactured in accordance with the particular requirements of the aircraft owner. One such aspect is the arrangement of the various components within the cabin of the aircraft, including the galleys, lavatories, passenger seats, cargo containers, section partitions, and other aircraft components. With conventional payload structure design, additional structure within the cabin of the aircraft is typically added as needed to account for larger than average loading caused by heavy monuments (e.g. lavatories, galleys, etc.) set between the floor and ceiling. When there is a need to move such monuments to different locations within the cabin of the aircraft, the floor, and potentially the walls and ceiling, need to be designed (or redesigned) to account for all potential monument locations.

For example, FIG. 1 is a side, partial cross-sectional view of a conventional support structure 50 and a payload assembly 52 in accordance with the prior art. FIG. 2 is a top elevational view of the conventional support structure 50 and payload assembly 52 of FIG. 1. The conventional support structure 50 includes a plurality of seat tracks 54 that extend longitudinally along the cabin of the aircraft. The seat tracks 54 are adapted to be coupled to a plurality of seat assemblies or other aircraft components, which may be positioned at desired locations along the seat tracks 54. Supplemental support members 56 are interspersed among the seat tracks 54 and extend beneath one or more of the payload assemblies 52 (FIG. 2). A plurality of floor panels 58 are disposed between the seat tracks 54 and the supplemental support members 56. At the edges of the floor panels 58, sealant is installed in the gap between the floor panel 58 edges and seat track 54, 56 edges and sealing tape 60 (not shown), which is several inches wide, is installed over the sealed gap to minimize leakage between the floor panels 58 and the associated seat tracks 54 and supplemental support members 56. Finally, plugs 62 are installed in the unused, exposed portions of the seat tracks 54 and the supplemental support members 56 in some areas of the cabin.

As shown in FIGS. 1 and 2, the desired locations of the payload assemblies 52 (e.g. galleys, lavatories, etc.) often do not lineup with the seat tracks 54, so that the supplemental support members 56 must be added to carry the loads. To move a payload assembly 52, such as a galley, to make room for changes in seating configuration or changes in layout, a lengthy series of tasks must typically be performed. For example, a galley area mat (not shown) must be removed. Next, payloads where the galley is going to be placed must also be removed (setting off another chain reaction of tasks). Sealing tape and sealant around where the initial position of the galley must be removed. Similarly, floor panels around the initial position of the galley must be removed. Sealing and sealing tape around the periphery of each of the floor panels must be removed, and the galley must be disconnected and moved out of the way. Next, old system interfaces must be removed and terminated (e.g. power, electronics, waste, air, heat, etc.), and new system interfaces that the new galley location must be designed, manufactured, and installed. The galley is then moved to the new location and installed, including connection of system interfaces, manufacture and installation of new floor panels, installation of sealant between the floor panels, installation of sealing tape over all floor panel edges, and installation of a new galley mat.

Although desirable results have been achieved using the conventional support structure 50 and payload assembly 52, there is room for improvement. For example, the above-noted process for repositioning the payload assemblies within the aircraft may require substantial labor and expense. The process may also involve the inclusion of unnecessary structure into the aircraft that causes considerable unnecessary weight that must be borne by the aircraft, resulting in increased operational costs. Therefore, novel processes for positioning, securing, and repositioning payload assemblies onto floor assemblies that at least partially mitigate these characteristics would be useful.

SUMMARY OF THE INVENTION

The present invention is directed to processes for positioning, securing, and repositioning payload assemblies onto floor assemblies. Embodiments of processes in accordance with the present invention may advantageously reduce the labor and expense associated with manufacturing a support structure in a passenger cabin of an aircraft, and with moving a payload within a cabin, in comparison with prior art apparatus and methods. Also, embodiments of apparatus and methods in accordance with the present invention may reduce the weight of the support structure, thereby reducing the operating costs of the aircraft.

In one embodiment, a method of forming an assembly for carrying a payload includes forming a support structure having a plurality of elongated engagement members, each engagement member including an engagement surface adapted to support a load; forming an adaptable payload assembly that includes a payload member and at least one payload support coupled to the payload member, the payload support being adapted to transmit loads from the payload member to at least one engagement member, the payload support being moveable with the payload member relative to the support structure; and removeably coupling the payload support to at least one of the engagement surfaces of the engagement members. In an alternate embodiment, forming a support structure includes forming a support structure wherein the engagement surfaces are at least one of approximately flush with and recessed below a lower surface of a panel supported by the support structure.

BRIEF DESCRIPTION OF THE DRAWINGS

The preferred and alternative embodiments of the present invention are described in detail below with reference to the following drawings.

DETAILED DESCRIPTION

The present invention relates to processes for positioning, securing, and repositioning payload assemblies onto floor assemblies. Many specific details of certain embodiments of the invention are set forth in the following description and in FIGS. 3-11 to provide a thorough understanding of such embodiments. One skilled in the art, however, will understand that the present invention may have additional embodiments, or that the present invention may be practiced without several of the details described in the following description.

Figure 3:
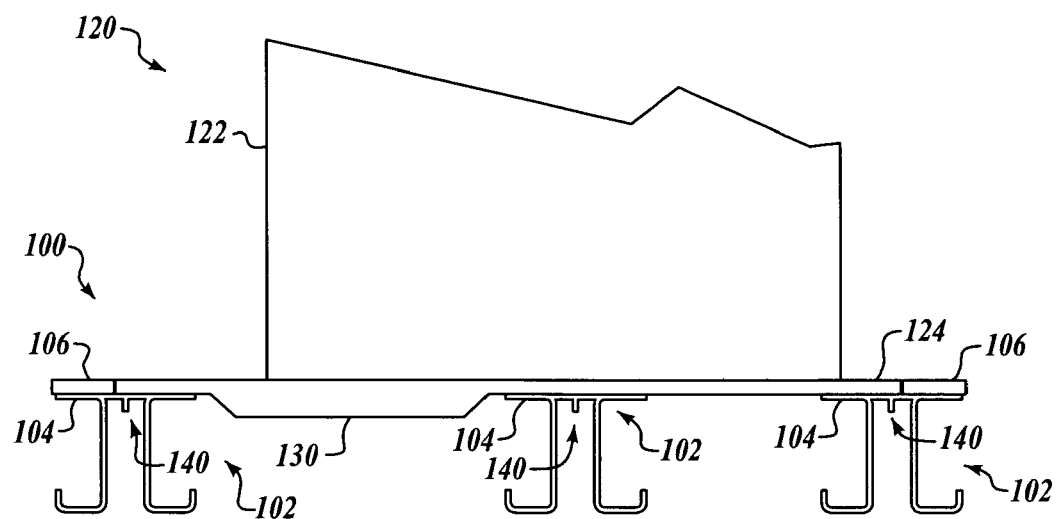
FIG. 3 is a side, partial cross-sectional view of an adaptable payload assembly in accordance with an embodiment of the present invention.
Figure 4:
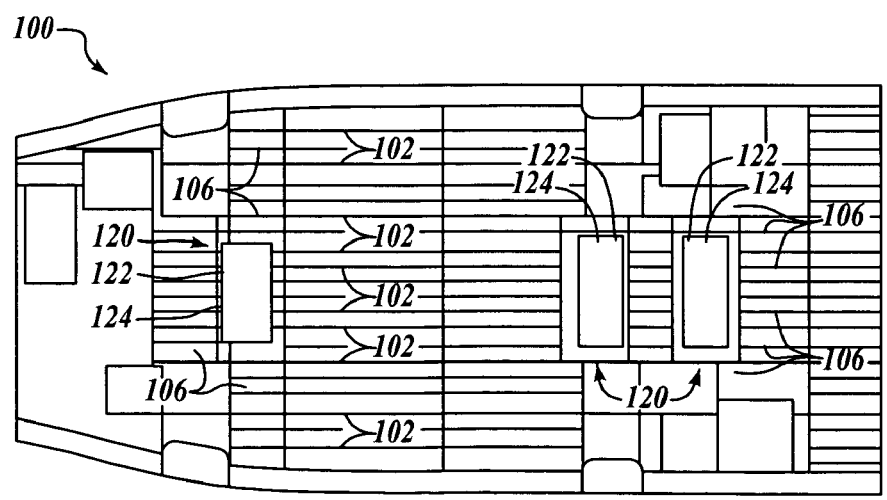
FIG. 4 is a top elevational view of an aircraft floor structure in accordance with an embodiment of the present invention.

FIG. 3 is a side, partial cross-sectional view of a support structure 100 and an adaptable payload assembly 120 in accordance with an embodiment of the present invention. FIG. 4 is a top elevational view of the support structure 100 and the adaptable payload assembly 120 of FIG. 3. In this embodiment, the support structure 100 includes a plurality of floor panels 106, and a plurality of elongated floor supports 102 disposed beneath the floor panels 106 and extending longitudinally along the cabin of the aircraft. Most importantly is what is missing. Special support members for payloads are not needed because the payloads can attach to the basic and stable enabling architecture provided by the seat tracks used for the seats. Small and numerous floor panels are not needed because floor panels no longer "break" on special support members and no longer "break" on seat tracks not needed for payload attachment but instead go over those in one piece.

Each of the floor supports 102 includes an engagement surface 104 (FIG. 3) that engages a lower surface of one or more of the floor panels 106, as described more fully in co-pending, commonly-owned U.S. patent application Ser. No. entitled "Non-Protruding Seat Track Apparatus and Methods", filed concurrently herewith on Mar. 29, 2004, and previously incorporated herein by reference.

Each of the floor supports 102 is situated significantly below the top surface of the floor panels 106 (and does not protrude above the top surface), and the engagement surface 104 is engaged against the lower surface of the floor panels 106. More specifically, in the embodiment shown in FIG. 3, the engagement surfaces 104 are approximately "flush" (as defined below) with or recessed below the lower surfaces of the floor panels 106 (and with the payload panel 124). The engagement surface 104 may engage the lower surface of the floor panels 106 directly or indirectly, as a variety of materials or components may be disposed between the engagement surface 104 and the lower surface of the floor panels 206, including, for example, an insert spacer, a clip-nut, cork, tape, or other materials or components.

It will be appreciated that the terms "flush" and "flush with" as used in this patent application when referring to the relationship between members that support floor panels (e.g. the engagement surface 104) and one or more adjacent surfaces (e.g. the lower surfaces of the floor panels 106, or other adjacent support surfaces that engage with the lower surfaces of the floor panels 106, etc.) should be construed as including "approximately flush" or "nearly flush," and should not be construed as being limited to a precisely co-planar condition. Moreover, as used in this context, the terms "flush" and "flush with" should be understood to include a condition of not significantly protruding above such adjacent surfaces. Thus, as used in this patent application, when the engagement surface is said to be "flush" with another surface, the engagement surface and the other surface need not be precisely co-planar, but rather, may be non-planar to a limited degree as long as a floor panel may extend continuously thereover without creating a tripping hazard or other unacceptable condition. Practically speaking, in some embodiments, the term "flush" may include an engagement surface that is up to about 0.2 inches higher than an adjacent surface. In other embodiments, the term "flush" may include an engagement surface that is up to about 0.17 inches higher than an adjacent surface as determined by an amount a floor panel is allowed to bend over uneven surfaces. In still other embodiments, the term "flush" may include an engagement surface that is up to about 0.04 inches lower than an adjacent surface. In further embodiments, a greater amount of non-planarity may be acceptable within the meaning of the term "flush" as used herein.

As further shown in FIG. 3, the payload assembly 120 includes a primary component 122 coupled to a payload panel 124. The primary component 122 may be, for example, a galley, a lavatory, a passenger seat, a cargo container, a section partition, a fireplace, shelving, a bed or other article of furniture, or any other component that may be located within the aircraft (or other vehicle or structure). For example, embodiments of the present invention may be used to secure dividing devices (or partitions) within the passenger cabin of an aircraft, as generally disclosed, for example, in U.S. Pat. No. 5,393,013 issued to Schneider et al., and to secure cargo containers as generally disclosed, for example, in U.S. Pat. No. 5,090,639 issued to Miller et al.

As further shown in FIG. 3, the payload assembly 120 further includes an intercostal 130 transversely disposed between a pair of adjacent floor supports 102. A plurality of payload attachment assemblies 140 coupled the payload panel 124 to the floor supports 102. The floor supports 102 are basic and stable members of the support structure 100.

The payload panel 124 may be composed of any material or buildup that meets the requirements of the application. For example, the payload panel 124 may be a composite sandwich panel, a plywood panel, a metal sheet, or any other suitable material or structure. As noted above, the payload panels 124 may include one or more additional members (e.g. the intercostal 130) that may be added when more load carrying capability is required so that such loads may be transmitted (or beamed) to adjacent basic and stable structure (e.g. the floor supports 102).

In operation, the support structure 100 having the floor supports 102 that are "flush" with the lower surfaces of the floor panels 106 and with the lower surfaces of the payload panel 124 provide a suitable enabling architecture that allows the payload assembly 120 to be economically relocated to other positions. As described more fully below, the payload assembly 120 can be picked up and moved anywhere within the passenger cabin of the aircraft by detaching the attachment assemblies 140 from the floor supports 102, moving the payload assembly 120 to a new location, reattaching the attachment assemblies 140 at the new location, and sealing the periphery of the payload panel 124. The intercostal 130 moves with the payload panel 124 to the new location.

It will be appreciated that the payload assembly 124 and components thereof (e.g. payload panels, intercostals, etc.) may have a variety of alternate embodiments, and should not be construed as being limited to the particular embodiments shown and described herein, including the embodiment shown in FIG. 3. A variety of alternate embodiments of payload assemblies and payload assembly components in accordance with the teachings of the invention are described in greater detail in co-pending, commonly-owned U.S. patent application Ser. No. 10/811,529 entitled "Adaptable Payload Apparatus and Methods," and previously incorporated herein by reference.

Embodiments of apparatus and methods in accordance with the present invention may provide significant advantages over the prior art. For example, because the floor supports are flush with the lower surfaces of the floor panels and the payload panels, these panels are not required to "break" at the locations of the floor supports. This allows the payload assembly to be moved with greater ease and economy in comparison with the prior art. Also, because the payload intercostal 130 beams to basic and stable floor supports 102 and is movable with the payload assembly 120, the amount of support structure that is carried on the aircraft may support members 56 (FIG. 1) that exist in the flex-zone areas of the cabin can be eliminated. The labor and expense associated with installation of the supplemental support members 56 is therefore reduced. Also, the unnecessary weight carried aboard the aircraft is reduced, and the plugs 62 that must be installed in the unused, exposed portions of the seat tracks 54 is reduced.

Figure 1:
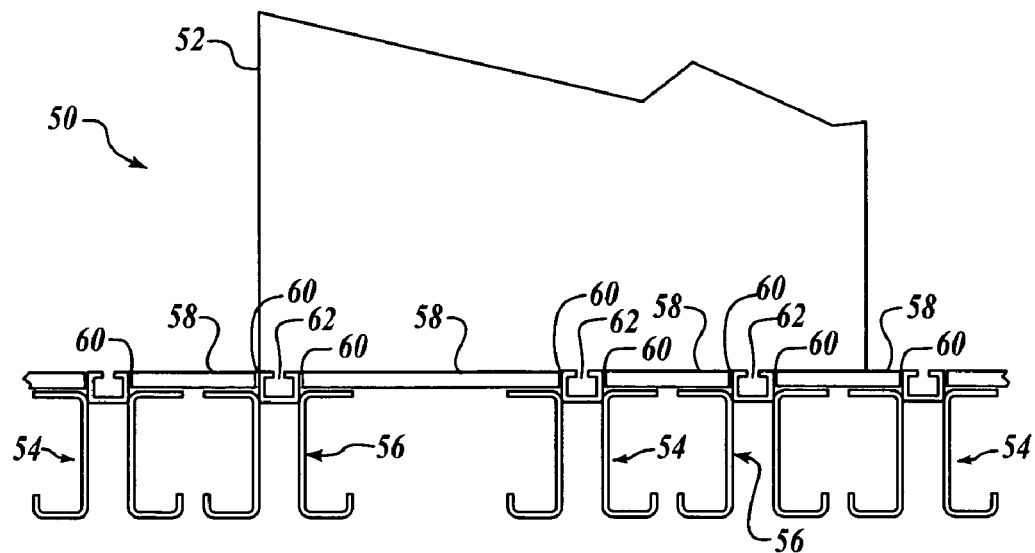
FIG. 1 is a side, partial cross-sectional view of a floor support structure and payload assembly in accordance with the prior art.
Figure 2:
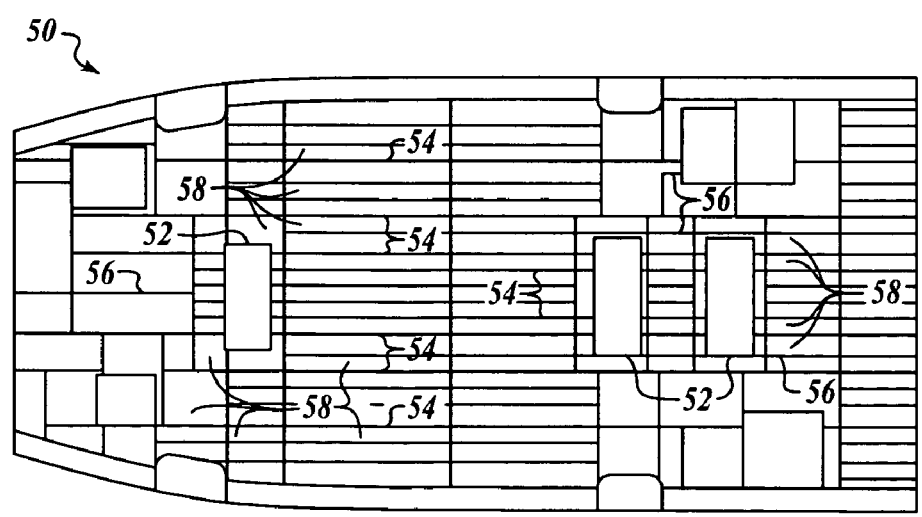
FIG. 2 is a top elevational view of a conventional floor support structure and payload assembly of FIG. 1 in accordance with the prior art.

In addition, the labor and expense associated with moving the payload assembly 120 to a new location within the aircraft is also reduced. For example, because the payload assembly 120 includes an intercostal 130 that moves with the payload assembly 120, the labor and expense associated with providing new supports at the new location is reduced or eliminated. Also, because the floor panels 106 and the payload panel 124 extend over the engagement surfaces of the floor supports 102 rather than "break" at the seat tracks 54 as shown in FIG. 1, the number of joints between the floor panels 106 and the supports 102, 126 is reduced. Therefore, the sealing requirements are simplified. More specifically, sealing between unlike materials, like the panels 106, 124 and the supports 102 is eliminated along two edges. Tape is simply applied over the joint between the floor panels 106 and the payload panel 124.

It may be appreciated that a variety of alternate embodiments in accordance with the invention may be conceived, and that the invention is not limited to the particular embodiments described above and shown in FIGS. 3–4. In the following discussion, various alternate embodiments of the invention will be described. For the sake of brevity, however, only significant differences in the structure and operation of these alternate embodiments will be described in detail. Where possible, similar components will be referenced using similar reference numbers.

Figure 5:
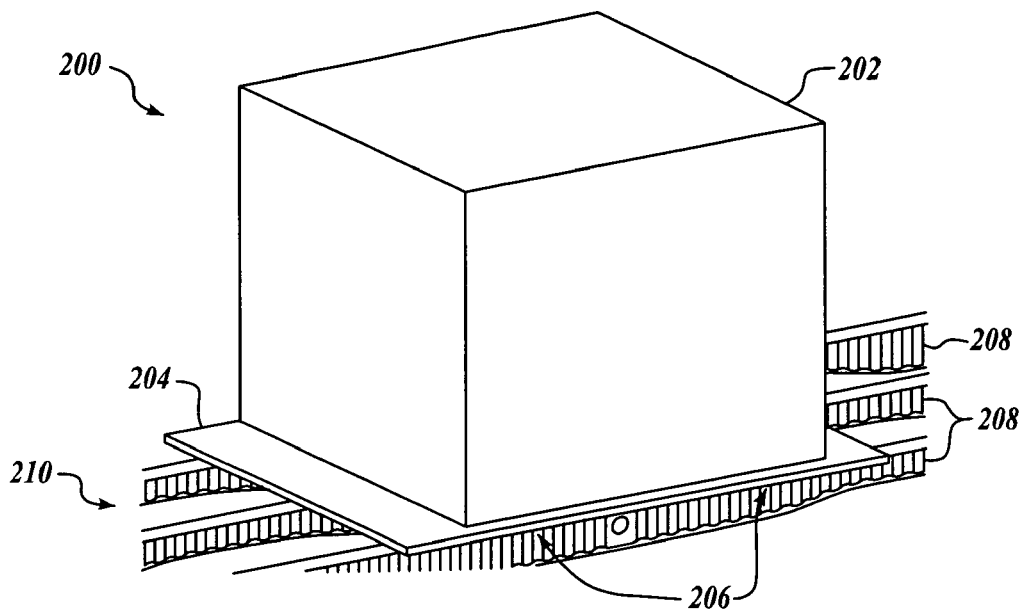
FIG. 5 is an upper isometric view of an adaptable payload assembly in accordance with an alternate embodiment of the invention.
Figure 6:
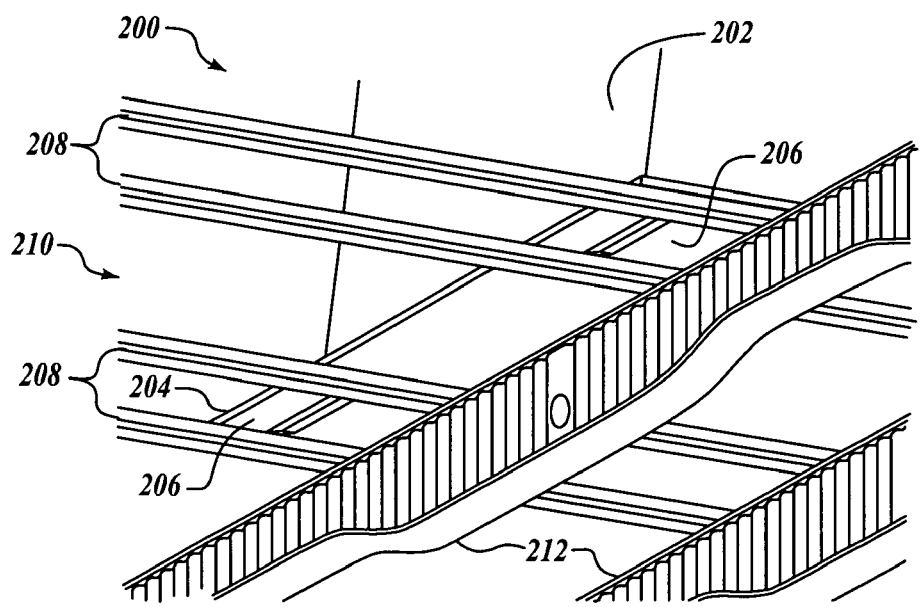
FIG. 6 is a lower isometric view of the payload assembly of FIG. 5.
Figure 7:
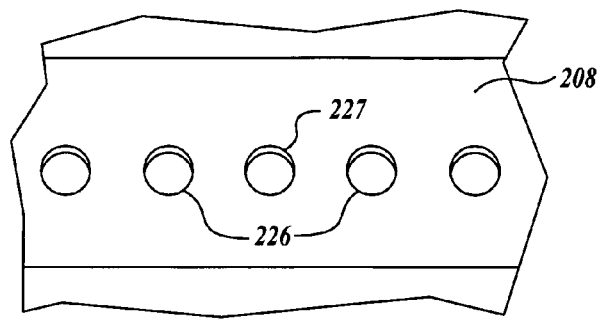
FIG. 7 is a top elevational view of an engagement member of FIG. 5.

FIG. 5 is an upper isometric view of an adaptable payload assembly 200 in accordance with an alternate embodiment of the invention. FIG. 6 is a lower isometric view of the adaptable payload assembly 200 of FIG. 5. In this embodiment, the payload assembly 200 includes a primary component 202 coupled to a payload panel 204 which is, in turn, coupled to a plurality of engagement members 208. FIG. 7 is a top elevational view of one of the engagement members 208 of FIG. 5. In this embodiment, the engagement member 208 has a plurality of coupling apertures 226 disposed therein. In alternate embodiments, the engagement members 208 may have a variety of different coupling slots, apertures, or other suitable coupling mechanisms, as described more fully in co-pending, commonly-owned U.S. patent application Ser. No. 10/811,522 entitled "Payload to Support Track Interface and Fitting Apparatus and Methods", filed concurrently herewith on Mar. 29, 2004, and previously incorporated herein by reference.

As best shown in FIG. 6, a plurality of intercostals 206 are coupled to a bottom surface of the payload panel 204. The intercostals 206 extend transversely between adjacent pairs of engagement members 208 of a floor assembly 210. In turn, the engagement members 208 may be engaged, as with this example, with support beams 212 of a support frame (e.g. an aircraft airframe). Thus, the payload assembly 200 may provide the above-noted advantages of flexibility, adaptability, economy and weight savings in an alternate embodiment of the invention.

Figure 8:
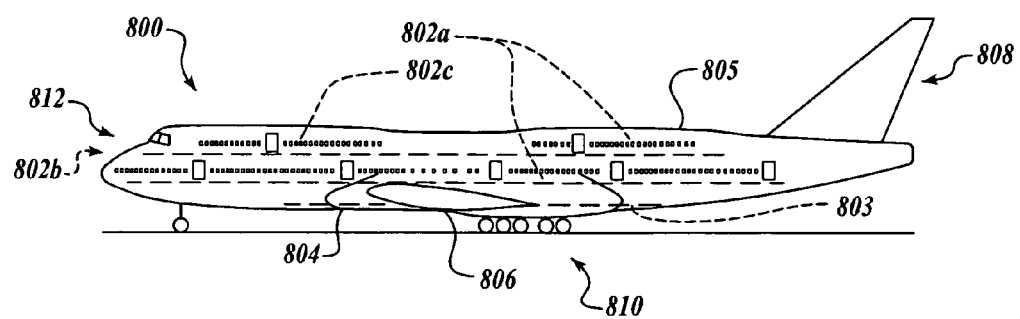
FIG. 8 is a side elevational view of an aircraft in accordance with yet another alternate embodiment of the invention.

As noted above, embodiments of the present invention may be used in a wide variety of applications, including aircraft. For example, FIG. 8 is a side elevational view of an aircraft 800 in accordance with another alternate embodiment of the present invention. In general, except for one or more assemblies 802 in accordance with the present invention, the various components and subsystems of the aircraft 800 may be of known construction and, for the sake of brevity, will not be described in detail herein. Embodiments of assemblies 802 for situating and securing payloads to support structures in accordance with the present invention may be employed in one or more desired locations throughout the aircraft 800.

More specifically, as shown in FIG. 8, the aircraft 800 includes one or more propulsion units 804 coupled to an airframe 803 (not visible) disposed within a fuselage 805, wing assemblies 806 (or other lifting surfaces), a tail assembly 808, a landing assembly 810, a control system 812 (not visible), and a host of other systems and subsystems that enable proper operation of the aircraft 800. The assemblies 800 for situating and securing payloads to support structures in accordance with the present invention are distributed throughout the various portions of the aircraft 800, including, for example, within the cockpit (802b), the first-class section (802c), and the coach or business class section (802a).

Although the aircraft 800 shown in FIG. 8 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in virtually any other types of aircraft. More specifically, the teachings of the present invention may be applied to other types and models of passenger aircraft and military aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. Furthermore, alternate embodiments of apparatus and methods in accordance with the present invention may be used in the other applications, including, for example, trucks, trailers, ships, buses, trains, recreational vehicles, subways, monorails, houses, apartments, office buildings, or any other desired application.

Figure 9:
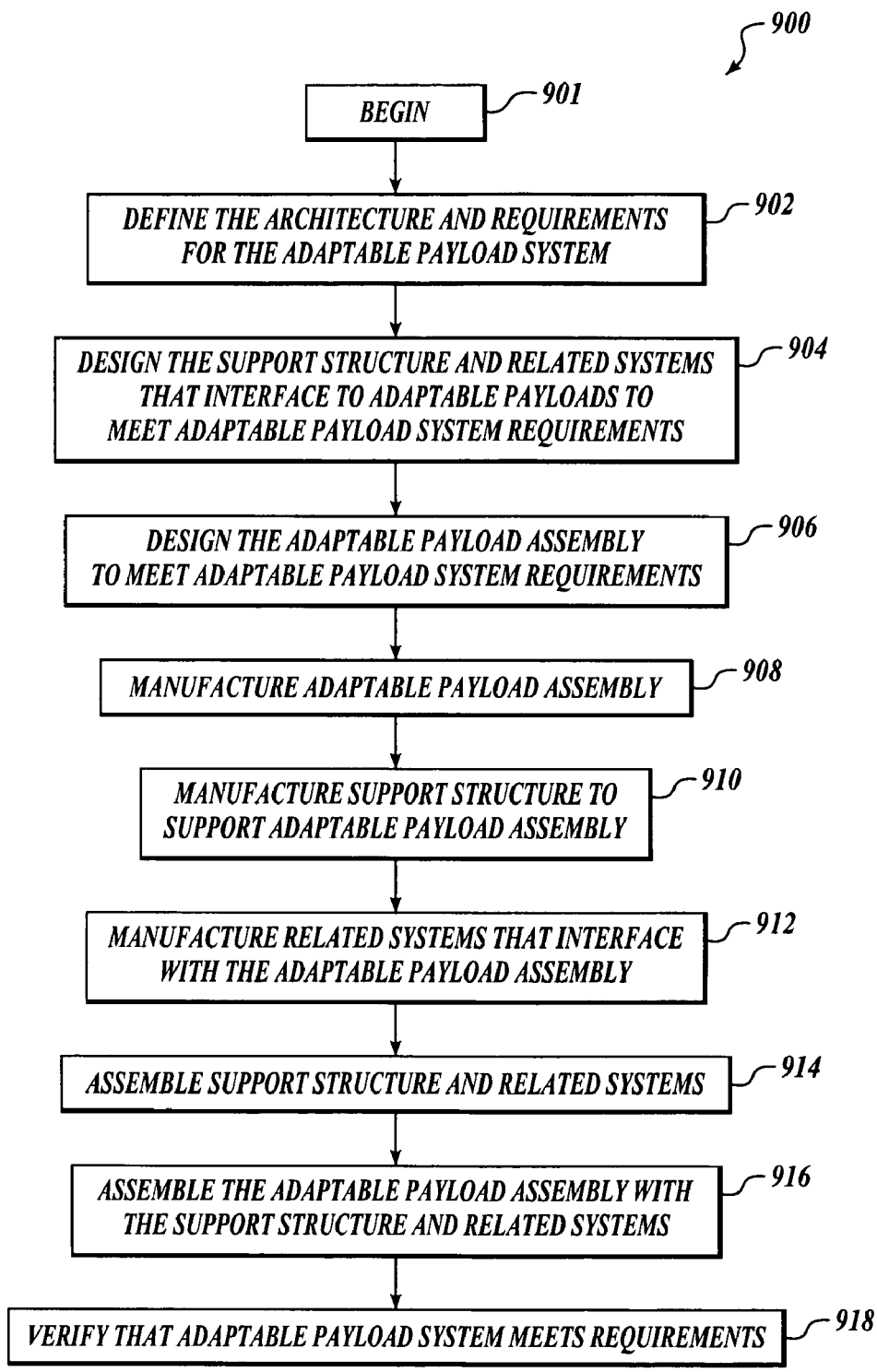
FIG. 9 is a flow chart of a process of forming an assembly in accordance with an embodiment of the invention.

FIG. 9 is a flow chart of a process 900 of forming an assembly in accordance with an embodiment of the invention. The process 900 begins at a block 902. At a block 904, the requirements for an adaptable payload system are defined. This may include, for example, the definition of: the functionality of each needed adaptable payload assembly; potential adaptable payload assembly locations and alternate locations; adaptable payload assembly loads and g-forces on the support structure; related support system requirements for each payload (e.g. electrical, electronic, water, waste, etc.); human senses (e.g. noise, touch, as that, etc.) requirements for each adaptable payload assembly; usability requirements for each adaptable payload assembly; human factor requirements associated with installation and movement of adaptable payload assemblies; sealing requirements of the adaptable payload assemblies; reliability and maintainability requirements for each adaptable payload assembly; regulatory requirements for each payload; business and manufacturability requirements of each payload and adaptable payload assemblies; and any other aspect of architecture and system requirements.

As further shown and FIG. 9, in this embodiment, the process 900 includes designing a support structure and related systems that interface to the adaptable payload assembly to meet adaptable payload system requirements at a block 904. The design of the support structure may include, for example, designing a floor assembly having a plurality of elongated engagement members, wherein each engagement member includes an engagement surface. In some embodiments, the design of the support structure requires that the engagement surfaces are situated significantly below the top surface of the floor panels (and does not protrude above the top surface). In further embodiments, the design of the support structure requires that the engagement surfaces are approximately flush with (as defined above) or recessed below the lower surfaces of the floor panels and payload panels. The design may further require that the engagement members are spaced apart and approximately parallel.

Similarly, at a block 906, the adaptable payload assembly that meets the adaptable payload system requirements is designed, and at a block 908, the adaptable payload assembly is manufactured. At least one of the design and manufacture (blocks 906 and 908) of the adaptable payload assembly may include the following: that the adaptable payload assembly includes a payload member and at least one payload support coupled to the payload member, the payload support being adapted to be removeably coupled to at least one of the engagement members so that it may carry loads from the payload member to the at least one engagement member, and the payload support is moveable with the payload member relative to the support structure.

At a block 910, the support structure to support the adaptable payload assembly is manufactured in accordance with the design (block 904). Again, the manufacturing (block 910) of the support structure may include, for example, forming a floor assembly having a plurality of elongated engagement members, wherein each engagement member includes an engagement surface. In some embodiments, the forming of the support structure includes that the engagement surfaces are situated significantly below the top surface of the floor panels (and does not protrude above the top surface). In further embodiments, the forming of the support structure includes that the engagement surfaces are approximately flush with (as defined above) or recessed below the lower surfaces of the floor panels and payload panels.

With continued reference to FIG. 9, the related systems that interface with the adaptable payload assembly are manufactured at a block 912, and the support structure and related systems are assembled at a block 914. Similarly, at a block 916, the adaptable payload assembly is assembled with the support structure and the related systems. The assembly performed at blocks 914 and 916 may include, for example, one or more of the following acts: installing the adaptable payload support structure on to the basic and stable enabling superstructure (e.g. an airframe of an aircraft, structural members of a building, structural members of a truck or other cargo carrier, etc.), installing the adaptable payload assembly on to the support structure, attaching the payload assembly to wall and ceiling supports, attaching a payload assembly to related systems (e.g. electrical, electronic, water, waste, etc.), installation of lower, wall, and ceiling trim around the adaptable payload assembly, sealing of the adaptable payload assembly, and any other suitable assembly operations. Finally, at a block 918, verification that the adaptable payload system meets the requirements defined above (block 902) is performed.

Figure 10:
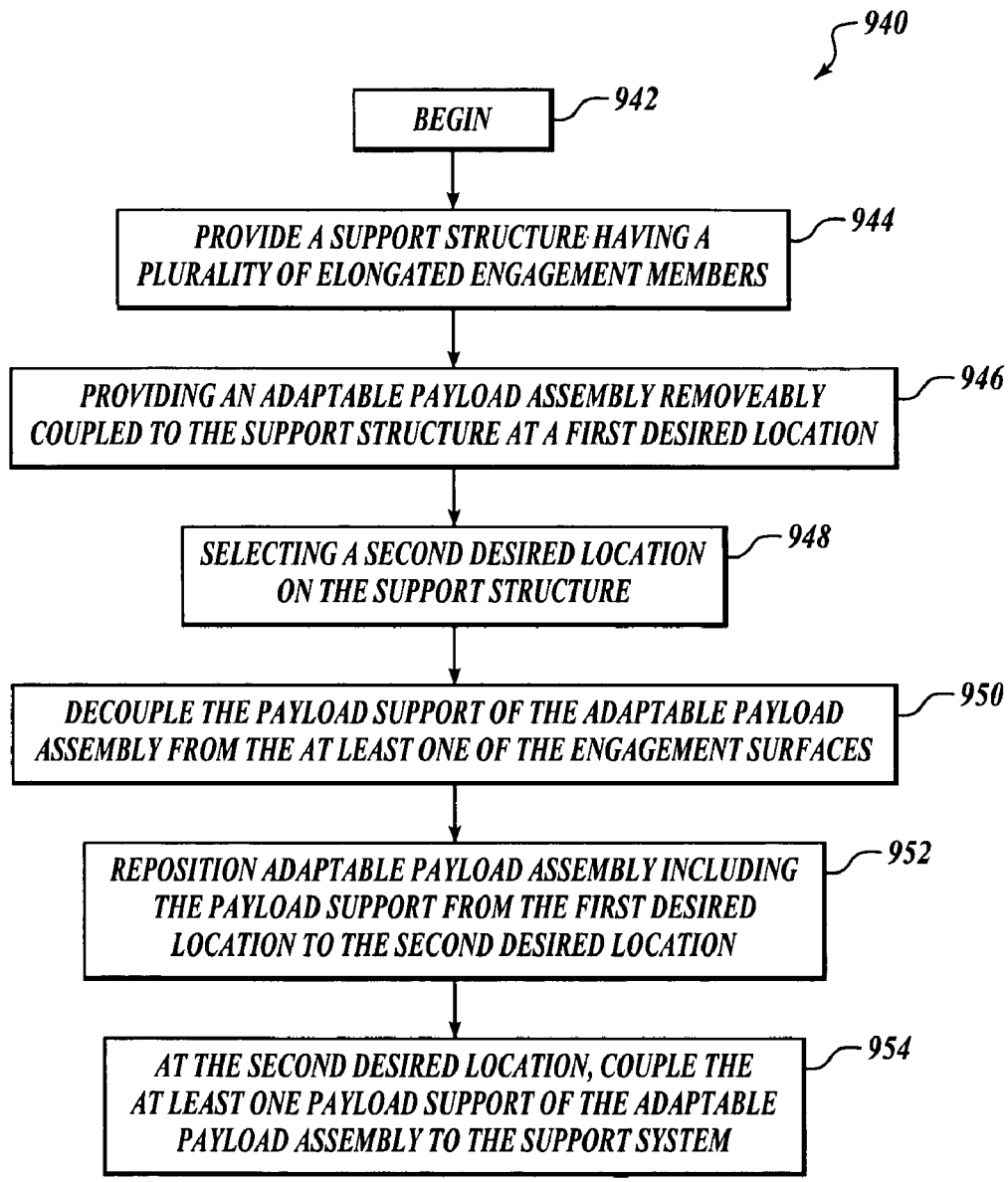
FIG. 10 is a flow chart of a process for positioning and repositioning a payload assembly on a support assembly in accordance with another embodiment of the invention.

FIG. 10 is a flow chart of a process 940 for positioning and repositioning a payload assembly on a support assembly in accordance with another embodiment of the invention. The process 940 begins at a block 942. At a block 944, the process 940 includes providing a support structure having a plurality of elongated engagement members, each engagement member including an engagement surface adapted to support a load. In alternate embodiments, the support structure provided at block 944 may include engagement surfaces that are at least one of approximately flush with and recessed below a lower surface of a panel (e.g. a floor panel, a payload panel, etc.) supported by the support structure. In further embodiments, the support structure provided at block 944 may include a floor assembly, an airframe, a structural member of a building, a structural member of a truck, a structural member of a vehicle, a structural member of a ship, and a structural member of a cargo carrier.

As further shown in FIG. 10, the process 940 includes providing an adaptable payload assembly removeably coupled to the support structure at a first desired location at a block 946. As described above, the adaptable payload assembly provided at block 946 may include a payload member and at least one payload support coupled to the payload member, the payload support being adapted to transmit loads from the payload member to at least one engagement member of the support structure, the payload support being moveable with the payload member relative to the support structure. In alternate embodiments, the adaptable payload assembly provided at block 946 may include at least one of a galley, a lavatory, a passenger seat, a cargo container, a section partition, a fireplace, a shelf, and an article of furniture.

The process 940 further includes selecting a second desired location for the adaptable payload assembly on the support structure at a block 948. At a block 950, the at least one payload support of the adaptable payload assembly is decoupled from the at least one of the engagement surfaces. The adaptable payload assembly including the payload support is repositioned from the first desired location to the second desired location at a block 952. With the adaptable payload assembly positioned at the second desired location, the at least one payload support of the adaptable payload assembly is coupled to at least one of the engagement surfaces of the engagement members at a block 954.

Figure 11:
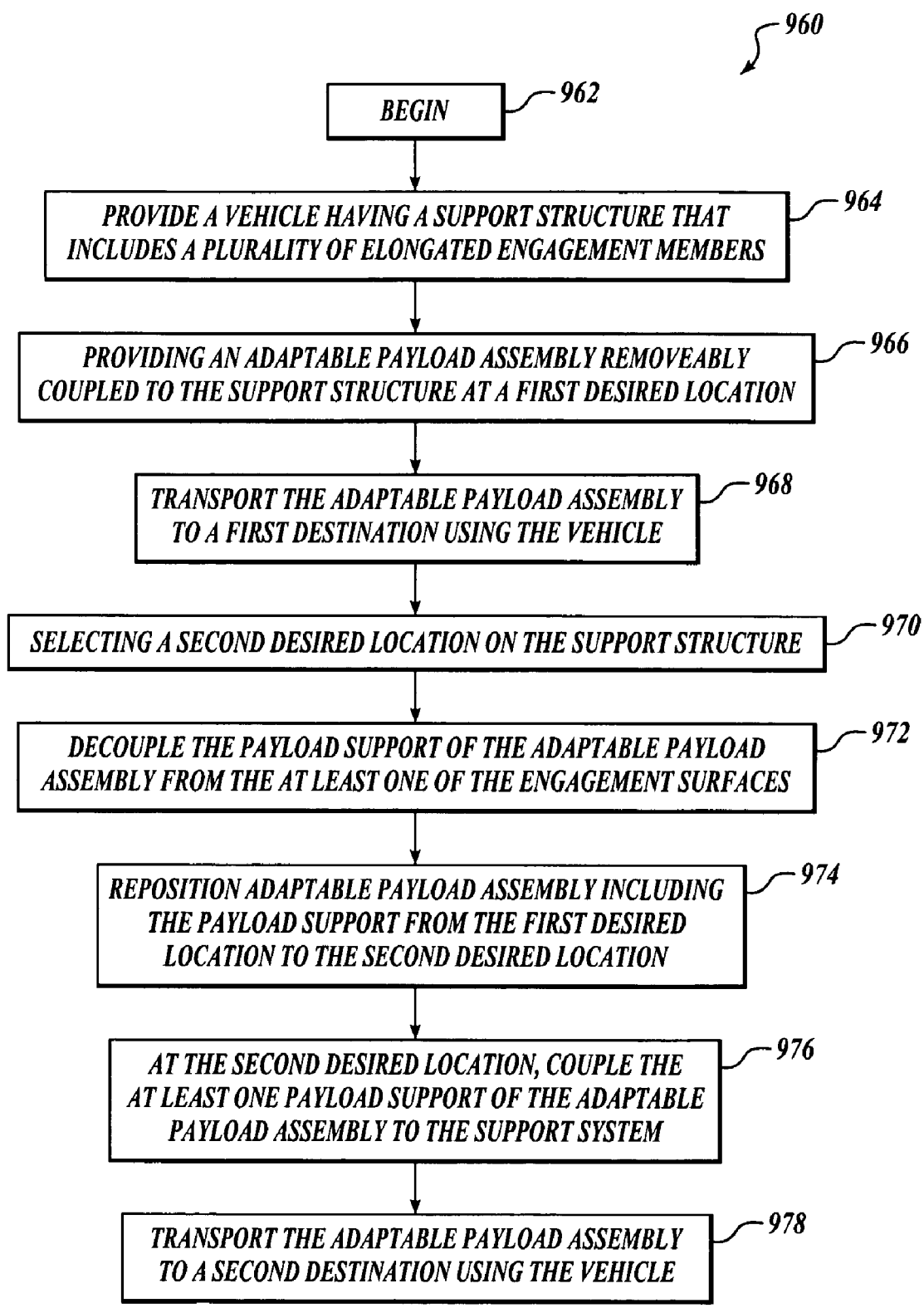
FIG. 11 is a flow chart of a process for using an assembly in accordance with another alternate embodiment of the invention.

FIG. 11 is a flow chart of a process 960 for using an assembly in accordance with another alternate embodiment of the invention. The process 960 begins at a block 962. At a block 964, a vehicle having a support structure that includes a plurality of elongated engagement members is provided. At a block 966, an adaptable payload assembly is removeably coupled to the support structure at a first desired location. At a block 968, the adaptable payload assembly is transported to a first destination using the vehicle. A second desired location on the support structure is selected at a block 970. The payload support of the adaptable payload assembly is decoupled from the at least one of the engagement surfaces at a block 972. At a block 974, the adaptable payload assembly including the payload support is repositioned from the first desired location to the second desired location. At the second desired location, the at least one payload support of the adaptable payload assembly is coupled to the support system at a block 976. And at a block 978, the adaptable payload assembly is transported to a second destination using the vehicle. Of course, in alternate embodiments, the vehicle of the process 960 may be an aircraft, a truck, a trailer, a ship, a train, or any other suitable payload carrying vehicle.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. A method of forming an assembly for carrying a payload, comprising:
    forming a support structure having a plurality of elongated engagement members, each engagement member including an engagement surface adapted to support a load;
    forming an adaptable payload assembly that includes a payload member and at least one payload support coupled to the payload member, the payload member including at least one of a galley, a lavatory, a passenger seat, a cargo container, a section partition, a fireplace, and an article of furniture, the payload support including a substantially flat portion having a pair of lateral edges, the substantially flat portion being adapted to span between at least two engagement members such that each of the lateral edges is adjacent to the engagement surface of a corresponding one of the engagement members, the payload support being adapted to transmit loads from the payload member to the engagement surfaces of the two engagement members, the payload support being moveable with the payload member relative to the support structure;
    removeably coupling the payload support to at least one of the engagement surfaces of the engagement members; and
    coupling at least one related system to the adaptable payload assembly, wherein coupling the at least one related system includes coupling at least one of an electrical system, an electronic system, a water system, an air vent system, an air conditioning system, a floor panel heat system, and a waste system to the adaptable payload assembly.

2. The method of claim 1, wherein forming a support structure includes forming a support structure wherein the engagement surfaces are at least one of approximately flush with and recessed below a lower surface of a panel supported by the support structure.

3. The method of claim 1, wherein the adaptable payload member includes a payload panel, and wherein forming a support structure includes forming a support structure wherein the engagement surfaces are at least one of approximately flush with and recessed below a lower surface of the payload panel.

4. The method of claim 1, wherein the forming a support structure includes forming a support structure adapted to support a floor panel, and wherein the engagement surfaces are at least one of approximately flush with and recessed below a lower surface of the floor panel.

5. The method of claim 1, further comprising defining the requirements of at least one of the support structure, the adaptable payload assembly, and a related system.

6. The method of claim 1, further comprising designing at least one of the support structure, the adaptable payload assembly, and a related system.

7. The method of claim 1, wherein forming a support structure includes forming a support structure wherein the elongated engagement members are approximately parallel.

8. The method of claim 1, wherein forming a support system includes forming at least one of a floor assembly, an airframe, a structural member of a building, a structural member of a truck, a structural member of a vehicle, a structural member of a ship, and a structural member of a cargo carrier.

9. The method of claim 1, further comprising at least one of installing a trim member around the adaptable payload assembly and sealing the adaptable payload assembly.

10. A method of forming an aircraft, comprising:
    forming an airframe;
    forming a fuselage operatively coupled to the airframe;
    operatively coupling a propulsion system to at least one of the airframe and the fuselage; and
    forming a support structure coupled to at least one of the airframe and the fuselage and having a plurality of elongated engagement members, each engagement member including an engagement surface adapted to support a load;

forming an adaptable payload assembly that includes a payload member and at least one payload support coupled to the payload member, the payload member including at least one of a galley, a lavatory, a passenger seat, a cargo container, a section partition, a fireplace, and an article of furniture, the payload support including a substantially flat portion having a pair of lateral edges, the substantially flat portion being adapted to span between at least two engagement members such that each of the lateral edges is adjacent to the engagement surface of a corresponding one of the engagement members, the payload support being adapted to transmit loads from the payload member to the engagement surfaces of the two engagement members, the payload support being moveable with the payload member relative to the support structure;

removeably coupling the payload support to at least one of the engagement surfaces of the engagement members; and coupling at least one related system to the adaptable payload assembly, wherein coupling the at least one related system includes coupling at least one of an electrical system, an electronic system, a water system, an air vent system, an air conditioning system, a floor panel heat system, and a waste system to the adaptable payload assembly.

11. The method of claim 10, wherein forming a support structure includes forming a support structure wherein the engagement surfaces are at least one of approximately flush with and recessed below a lower surface of a panel supported by the support structure.

12. The method of claim 10, wherein the adaptable payload member includes a payload panel, and wherein forming a support structure includes forming a support structure wherein the engagement surfaces are at least one of approximately flush with and recessed below a lower surface of the payload panel.

13. The method of claim 10, wherein the forming a support structure includes forming a support structure adapted to support a floor panel, and wherein the engagement surfaces are at least one of approximately flush with and recessed below a lower surface of the floor panel.

14. The method of claim 10, forming a support structure includes forming a support structure wherein the elongated engagement members are mostly parallel.

15. A method of adaptably positioning a payload, comprising:

providing a support structure having a plurality of elongated engagement members, each engagement member including an engagement surface adapted to support a load;

providing an adaptable payload assembly removeably coupled to the support structure at a first desired location, the adaptable payload assembly having a payload member and at least one payload support coupled to the payload member, the payload member including at least one of a galley, a lavatory, a passenger seat, a cargo container, a section partition, a fireplace, and an article of furniture, the payload support including a substantially flat portion having a pair of lateral edges, the substantially flat portion being adapted to span between at least two engagement members such that each of the lateral edges is adjacent to the engagement surface of a corresponding one of the engagement members, the payload support being adapted to transmit loads from the payload member to the engagement surfaces of the two engagement members of the support structure, the payload support being moveable with the payload member relative to the support structure; and selecting a second desired location on the support structure;

decoupling the at least one payload support of the adaptable payload assembly from the at least one of the engagement surfaces;

repositioning the adaptable payload assembly including the payload support from the first desired location to the second desired location;

with the adaptable payload assembly positioned at the second desired location, coupling the at least one payload support of the adaptable payload assembly to at least one of the engagement surfaces of the engagement members; and coupling at least one related system to the adaptable payload assembly, wherein coupling the at least one related system includes coupling at least one of an electrical system, an electronic system, a water system, an air vent system, an air conditioning system, a floor panel heat system, and a waste system to the adaptable payload assembly.

16. The method of claim 15, wherein providing a support structure includes providing a support structure wherein the engagement surfaces are at least one of approximately flush with and recessed below a lower surface of a panel supported by the support structure.

17. The method of claim 15, wherein providing an adaptable payload assembly includes providing an adaptable payload assembly having a payload panel, and wherein providing a support structure includes providing a support structure wherein the engagement surfaces are at least one of approximately flush with and recessed below a lower surface of the payload panel.

18. The method of claim 15, wherein the providing a support structure includes providing a support structure adapted to support a floor panel, and wherein the engagement surfaces are at least one of approximately flush with and recessed below a lower surface of the floor panel.

19. The method of claim 15, wherein providing a support structure includes providing a support structure wherein the elongated engagement members are approximately parallel.

20. The method of claim 15, wherein providing a support system includes providing at least one of a floor assembly, an airframe, a structural member of a building, a structural member of a truck, a structural member of a vehicle, a structural member of a ship, and a structural member of a cargo carrier.

21. A method of adaptably positioning a payload, comprising:

providing a support structure having a plurality of elongated engagement members, each engagement member including an engagement surface adapted to support a load;

providing an adaptable payload assembly removeably coupled to the support structure at a first desired location, the adaptable payload assembly having a payload member and at least one payload support coupled to the payload member, the payload member including at least one of a galley, a lavatory, a passenger seat, a cargo container, a section partition, a fireplace, and an article of furniture, the payload support including a substantially flat portion having a pair of lateral edges, the substantially flat portion being adapted to span between at least two engagement members such that each of the lateral edges is adjacent to the engagement surface of a corresponding one of the engagement members, the payload support being adapted to transmit loads from the payload member to the engagement surfaces of the two engagement members of the support structure, the payload support being moveable with the payload member relative to the support structure; and selecting a second desired location on the support structure;

decoupling the at least one payload support of the adaptable payload assembly from the at least one of the engagement surfaces;

repositioning the adaptable payload assembly including the payload support from the first desired location to the second desired location;

with the adaptable payload assembly positioned at the second desired location, coupling the at least one payload support of the adaptable payload assembly to at least one of the engagement surfaces of the engagement members; and coupling at least one related system to the adaptable payload assembly, wherein coupling the at least one related system includes coupling at least one of an electrical system, an electronic system, a water system, an air vent system, an air conditioning system, a floor panel heat system, and a waste system to the adaptable payload assembly.

22. The method of claim 21, wherein providing a floor assembly includes providing a floor assembly wherein the engagement surfaces are at least one of approximately flush with and recessed below a lower surface of a panel supported by the floor assembly.

23. The method of claim 21, wherein providing an adaptable payload assembly includes providing an adaptable payload assembly having a payload panel, and wherein providing a floor assembly includes providing a floor assembly wherein the engagement surfaces are at least one of approximately flush with and recessed below a lower surface of the payload panel.

24. The method of claim 21, wherein the providing a floor assembly includes providing a floor assembly adapted to support a floor panel, and wherein the engagement surfaces are at least one of approximately flush with and recessed below a lower surface of the floor panel.

25. A method of transporting a payload, comprising:

providing a vehicle having a support structure including a plurality of elongated engagement members, each engagement member including an engagement surface adapted to support a load;

providing an adaptable payload assembly removeably coupled to the support structure at a first desired location, the adaptable payload assembly having a payload member and at least one payload support coupled to the payload member, the payload member including at least one of a galley, a lavatory, a passenger seat, a cargo container, a section partition, a fireplace, and an article of furniture, the payload support including a substantially flat portion having a pair of lateral edges, the substantially flat portion being adapted to span between at least two engagement members such that each of the lateral edges is adjacent to the engagement surface of a corresponding one of the engagement members, the payload support being adapted to transmit loads from the payload member to the engagement surfaces of the two engagement members of the support structure, the payload support being moveable with the payload member relative to the support structure;

coupling at least one related system to the adaptable payload assembly, wherein coupling the at least one related system includes coupling at least one of an electrical system, an electronic system, a water system, an air vent system, an air conditioning system, a floor panel heat system, and a waste system to the adaptable payload assembly; and transporting the adaptable payload assembly to a first destination using the vehicle.

26. The method of claim 25, further comprising:

selecting a second desired location on the support structure;

decoupling the at least one payload support of the adaptable payload assembly from the at least one of the engagement surfaces;

repositioning the adaptable payload assembly including the payload support from the first desired location to the second desired location;

with the adaptable payload assembly positioned at the second desired location, coupling the at least one payload support of the adaptable payload assembly to at least one of the engagement surfaces of the engagement members; and transporting the adaptable payload assembly to a second destination using the vehicle.

27. The method of claim 25, wherein providing a support structure includes providing a support structure wherein the engagement surfaces are at least one of approximately flush with and recessed below a lower surface of a panel supported by the support structure.

28. The method of claim 25, wherein providing an adaptable payload assembly includes providing an adaptable payload assembly having a payload panel, and wherein providing a support structure includes providing a support structure wherein the engagement surfaces are at least one of approximately flush with and recessed below a lower surface of the payload panel.

29. The method of claim 25, wherein the providing a support structure includes providing a support structure adapted to support a floor panel, and wherein the engagement surfaces are at least one of approximately flush with and recessed below a lower surface of the floor panel.

30. The method of claim 25, wherein providing a support structure includes providing a support structure wherein the elongated engagement members are approximately parallel.

31. The method of claim 25, wherein providing a support system includes providing at least one of a floor assembly, an airframe, a structural member of a truck, a structural member of a trailer, a structural member of a ship, and a structural member of a cargo carrier.

32. A method of transporting a payload using an aircraft, comprising:

providing a support structure with the aircraft having a plurality of elongated engagement members, each engagement member including an engagement surface adapted to support a load;

providing an adaptable payload assembly removeably coupled to the support structure at a first desired location within the aircraft, the adaptable payload assembly having a payload member and at least one payload support coupled to the payload member, the payload member including at least one of a galley, a lavatory, a passenger seat, a cargo container, a section partition, a fireplace, and an article of furniture, the payload support including a substantially flat portion having a pair of lateral edges, the substantially flat portion being adapted to span between at least two engagement members such that each of the lateral edges is adjacent to the engagement surface of a corresponding one of the engagement members, the payload support being adapted to transmit loads from the payload member to the engagement surfaces of the two engagement members of the support structure, the payload support being moveable with the payload member relative to the support structure;

coupling at least one related system to the adaptable payload assembly, wherein coupling the at least one related system includes coupling at least one of an electrical system, an electronic system, a water system, an air vent system, an air conditioning system, a floor panel heat system and a waste system to the adaptable payload assembly; and transporting the adaptable payload assembly to a first destination using the aircraft.

33. The method of claim 32, further comprising:

selecting a second desired location on the support structure;

decoupling the at least one payload support of the adaptable payload assembly from the at least one of the engagement surfaces;

repositioning the adaptable payload assembly including the payload support from the first desired location to the second desired location within the aircraft;

with the adaptable payload assembly positioned at the second desired location, coupling the at least one payload support of the adaptable payload assembly to at least one of the engagement surfaces of the engagement members; and transporting the adaptable payload assembly to a second destination using the aircraft.

34. The method of claim 32, wherein providing a support structure within the aircraft includes providing a support structure wherein the engagement surfaces are at least one of approximately flush with and recessed below a lower surface of a panel supported by the support structure.

35. The method of claim 32, wherein providing an adaptable payload assembly includes providing an adaptable payload assembly having a payload panel, and wherein providing a support structure includes providing a support structure wherein the engagement surfaces are at least one of approximately flush with and recessed below a lower surface of the payload panel.

36. The method of claim 32, wherein the providing a support structure within the aircraft includes providing a support structure adapted to support a floor panel, and wherein the engagement surfaces are at least one of approximately flush with and recessed below a lower surface of the floor panel.

37. The method of claim 32, wherein providing a support structure includes providing a support structure wherein the elongated engagement members are approximately parallel.

* * * * *